United States Patent
Li (10) Patent No.: US 8,659,563 B2
(45) Date of Patent: Feb. 25, 2014

(54) ELECTRONIC DEVICE WITH A PAGE TURNING FUNCTION DURING A SLEEP MODE OF THE ELECTRONIC DEVICE

(75) Inventor: Li-Ren Li, Tu-Cheng (TW)

(73) Assignees: Hon Hai Precision Industry Co., Ltd., New Taipei (TW); Koobe Inc., New Taipei (TW)

(*) Notice: Subject to any disclaimer, the term of this patent is extended or adjusted under 35 U.S.C. 154(b) by 368 days.

(21) Appl. No.: 13/092,155

(22) Filed: Apr. 22, 2011

(65) Prior Publication Data

US 2012/0249431 A1  Oct. 4, 2012

(30) Foreign Application Priority Data

Apr. 1, 2011  (CN) .......................... 2011 1 0081589

(51) Int. Cl.
*G09G 5/00* (2006.01)

(52) U.S. Cl.
USPC ........... 345/173; 345/156; 345/178; 715/732; 715/863

(58) Field of Classification Search
USPC ............... 345/156, 173–178; 455/566, 556.1, 455/556.2; 715/732, 863
See application file for complete search history.

(56) References Cited

U.S. PATENT DOCUMENTS

| | | | |
|---|---|---|---|
| 2005/0138454 A1* | 6/2005 | Darmawaskita et al. | 713/323 |
| 2007/0247441 A1* | 10/2007 | Kim et al. | 345/173 |
| 2009/0251439 A1* | 10/2009 | Westerman et al. | 345/175 |
| 2011/0029920 A1* | 2/2011 | Kang | 715/810 |
| 2012/0081337 A1* | 4/2012 | Camp et al. | 345/177 |

FOREIGN PATENT DOCUMENTS

| | | |
|---|---|---|
| CN | 1877506 | 12/2006 |
| CN | 101256466 | 9/2008 |
| CN | 201247448 | 5/2009 |
| CN | 101504585 | 8/2009 |
| CN | 101833918 | 9/2010 |

\* cited by examiner

*Primary Examiner* — Jennifer Nguyen
(74) *Attorney, Agent, or Firm* — Altis Law Group, Inc.

(57) ABSTRACT

An electronic device includes a touch screen, a microcontroller (MCU), and a central processing unit (CPU). The MCU detects a plurality of touch inputs one the touch screen when the CPU is in a sleep mode, determines whether the touch inputs form a touch event, and wakens the CPU from the sleep mode upon the condition that the touch inputs form the touch event. The CPU obtains the touch event from the MCU and executes the touch event to quickly turn a page of an e-book of the electronic device.

17 Claims, 5 Drawing Sheets

ELECTRONIC DEVICE WITH A PAGE TURNING FUNCTION DURING A SLEEP MODE OF THE ELECTRONIC DEVICE

BACKGROUND

1. Technical Field

The present disclosure relates to electronic devices, and more particularly to an electronic device with a page turning function during a sleep mode of the electronic device.

2. Description of Related Art

Generally, an electronic device such as an e-book includes a central processing unit (CPU) and a microcontroller (MCU) that cooperatively carry out functions of the e-book. In order to save power, the e-book automatically enters a sleep mode while the user is reading the e-book after turning a page of the e-book.

When the e-book enters the sleep mode, the CPU also enters the sleep mode and cannot do anything, while the MCU executes basic functions of the e-book, such as recording touch inputs including a left pressing action and a right pressing action. After being awakened, the CPU needs to obtain the touch inputs from the MCU, and then transforms the touch inputs to a touch event such as a left sliding action or a right sliding action, and executes the touch event to turn a page of the e-book. Thus, the e-book has a non-ideal speed for turning the page.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

Figure 1:
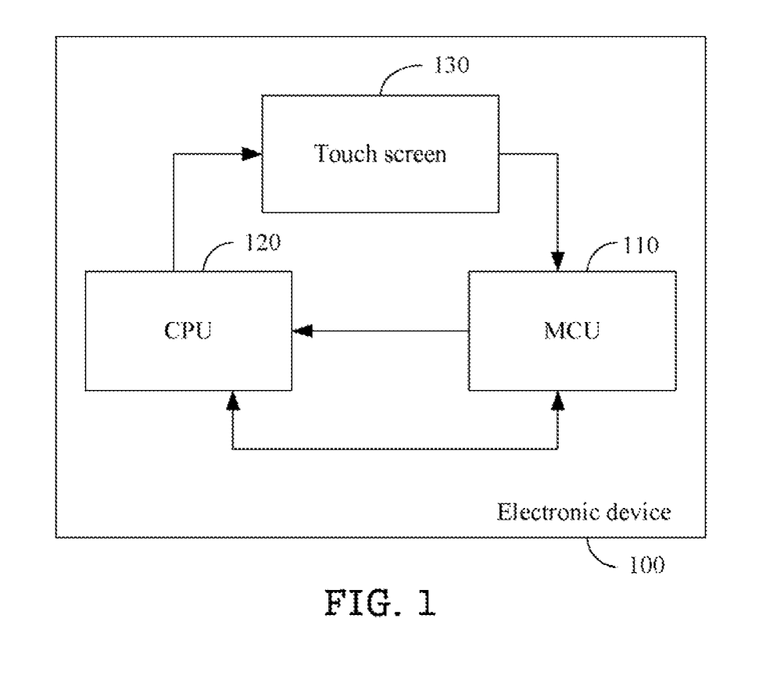
FIG. 1 is a schematic diagram of one embodiment of an electronic device comprising function modules.

FIG. 1 is a schematic diagram of one embodiment of an electronic device 100 comprising function modules. In one embodiment, the electronic device 100 may be an e-book, or any other electronic device with an e-book function, such as a mobile phone, a tablet computer, for example.

The electronic device 100 includes a microcontroller (MCU) 110, a central processing unit (CPU) 120, and a touch screen 130, to cooperatively carry out functions of the electronic device 100. When a user turns a page of an e-book of the electronic device 100, the electronic device 100 enters a sleep mode, and the CPU 120 also enters the sleep mode, which means that the CPU 120 is silent on operations while, at the time, the MCU 110 executes basic functions of the electronic device 100, such as detecting touch inputs on the touch screen 130. In one embodiment, the touch inputs include a left pressing action, a left releasing action, a right pressing action, and a right releasing action, for example.

In one embodiment, while the electronic device 100 is in the sleep mode, the MCU 110 detects a plurality of touch inputs on the touch screen 130, and determines whether the touch inputs form a touch event. When the touch inputs form a touch event, the MCU 110 wakens the CPU 120 from the sleep mode. The touch event is a sliding action on the touch screen 130. After being wakened up, the CPU 120 obtains the touch event from the MCU 110 and executes the touch event to quickly turn a page of an e-book of the electronic device 100.

In one embodiment, the touch event includes a left sliding action and a right sliding action on the touch screen 130. Each touch event can only be initiated by a left pressing action or a right pressing action, and at least include the left pressing action and the right pressing action. The left sliding action is a sliding action from right to left on the touch screen 130. The right sliding action is a sliding action from left to right on the touch screen 130.

In detail, the MCU 110 determines that the right sliding action on the touch screen 130 is formed when the MCU 110 detects the left pressing action and the right pressing action on the touch screen 130 in sequence. The MCU 110 determines that the right sliding action on the touch screen 130 is formed when the MCU 110 detects the left pressing action, the left releasing action, and the right pressing action on the touch screen 130 in sequence. The MCU 110 determines that the right sliding action on the touch screen 130 is formed when the MCU 110 detects the left pressing action, the left releasing action, the right pressing action, and the right releasing action on the touch screen 130 in sequence.

The MCU 110 determines that the left sliding action on the touch screen 130 is formed when the MCU 110 detects the right pressing action and the left pressing action on the touch screen 130 in sequence. The MCU 110 determines that the left sliding action on the touch screen is formed when the MCU 110 detects the right pressing action, the right releasing action, and the left pressing action on the touch screen 130 in sequence. The MCU 110 determines that the left sliding action on the touch screen 130 is formed when the MCU 110 detects the right pressing action, the right releasing action, the left pressing action, and the left releasing action on the touch screen 130 in sequence.

It should be noted that the plurality of touch inputs on the touch screen 130 can include different pressing actions and releasing actions on different areas of the touch screen 130 according to different requirements. For example, the plurality of touch inputs may include an up pressing action, an up releasing action, a down pressing action and a down releasing action. The touch event may include an up sliding action and a down sliding action on the touch screen 130. Each touch event can only be initiated by the up pressing action or the down pressing action, and at least include the up pressing action and the down pressing action. The up sliding action is a sliding action from down to up on the touch screen 130. The down sliding action is a sliding action from up to down on the touch screen 130.

In detail, the MCU 110 determines that the down sliding action on the touch screen 130 is formed when the MCU 110 detects the up pressing action and the down pressing action on the touch screen 130 in sequence. The MCU 110 determines that the down sliding action on the touch screen 130 is formed when the MCU 110 detects the up pressing action, the up releasing action, and the down pressing action on the touch screen 130 in sequence. The MCU 110 determines that the down sliding action on the touch screen 130 is formed when the MCU 110 detects the up pressing action, the up releasing action, the down pressing action, and the down releasing action on the touch screen 130 in sequence.

The MCU 110 determines that the up sliding action on the touch screen 130 is formed when the MCU 110 detects the down pressing action and the up pressing action on the touch screen 130 in sequence. The MCU 110 determines that the up sliding action on the touch screen is formed when the MCU 110 detects the down pressing action, the down releasing action, and the up pressing action on the touch screen 130 in sequence. The MCU 110 determines that the up sliding action on the touch screen 130 is formed when the MCU 110 detects the down pressing action, the down releasing action, the up pressing action, and the up releasing action on the touch screen 130 in sequence.

Figure 2:
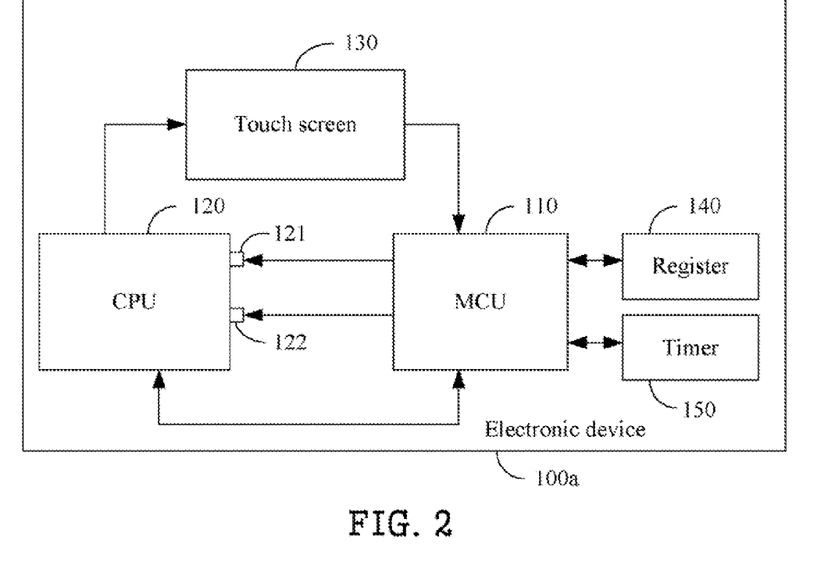
FIG. 2 is a schematic diagram of another embodiment of an electronic device comprising function modules.

FIG. 2 is a schematic diagram of another embodiment of an electronic device 100a comprising functional modules. In one embodiment, the electronic device 100a is similar to the electronic device 100 of FIG. 1, and the difference is that the electronic device 100a further comprises a register 140 and a timer 150. When electronic device 100a enters a sleep mode, the CPU 120 enters a sleep mode and cannot do anything.

Figure 3:
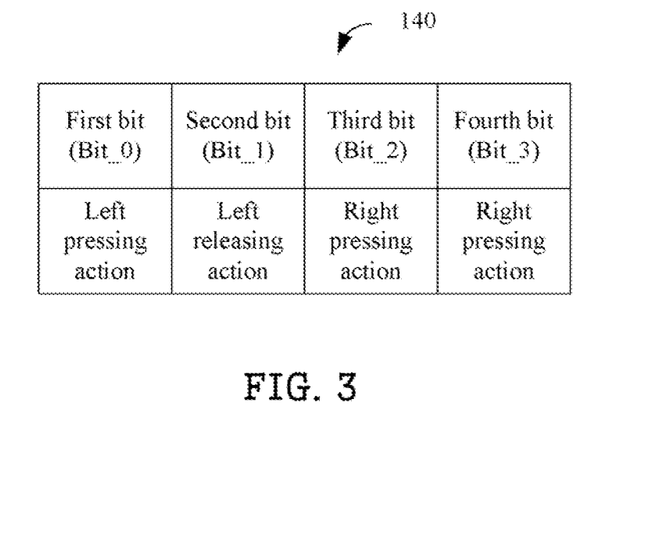
FIG. 3 is a schematic diagram of one embodiment of a register of the electronic device in accordance with the present disclosure.

The register 140 is operable to record the touch inputs including the left pressing action, the left releasing action, the right pressing action, and the right releasing action on the touch screen 130. Referring to FIG. 3, the register 140 includes a first bit (Bit_0), a second bit (Bit_1), a third bit (Bit_2), and a fourth bit (Bit_3), respectively operable to record the left pressing action, the left releasing action, the right pressing action, and the right releasing action one the touch screen 130.

The MCU 110 detects a plurality of touch inputs on the touch screen 130 according to a predefined interval cycle, and records the touch inputs in the register 140. For example, if the MCU 110 detects one left pressing action on the touch screen 130, the MCU 110 changes the first bit (Bit_0) to 1 in order to record the left pressing action. If the MCU 110 detects one left releasing action on the touch screen 130, the MCU 110 changes the second bit (Bit_1) to 1 in order to record the left releasing action. If the MCU 110 detects one right pressing action on the touch screen 130, the MCU 110 changes the third bit (Bit_2) to 1 in order to record the right pressing action. If the MCU 110 detects one right releasing action on the touch screen 130, the MCU 110 changes the fourth bit (Bit_3) to 1 in order to record the right releasing action.

In one embodiment, the predefined interval cycle indicates that a time difference between time for detecting two neighbor touch inputs, which can be set to 30 ms. For example, the MCU 110 detects one touch input on the touch screen 130, then waits for the predefined interval cycle of 30 ms, and then detects a next touch input on the touch screen 130. The detailed flowchart of detecting the touch inputs on the touch screen 130 will be described in FIG. 4.

The timer 150 is used for timing according to a predefined time period such as 0.5 S. In one embodiment, duration of each touch event is not greater than the predefined time period.

The MCU 110 reads the touch inputs from the register 140, and determines whether the touch inputs within the predefined time period form a touch event. An initial touch input of one touch event can only be the left pressing action or the right pressing action because the touch event can only be initiated by the left pressing action or the right pressing action. For example, it is assumed that the predefined time period of the timer 150 is 0.5 S, and the timer 150 starts to time when the MCU 110 reads an initial touch input from the register 140. Then the MCU 110 reads latter touch inputs from the register 140 during the predefined time period. If the initial and latter touch inputs read by the MCU 110 during the predefined time period cannot form one touch event until the timer 150 times out, the MCU 110 discards the initial and latter touch inputs. Then, the MCU 110 reads a next initial touch input from the register 140, and simultaneously the timer 150 re-starts to time.

If the initial and latter touch inputs read by the MCU 110 during the predefined time period form one touch event before the timer 150 times out, the MCU 110 saves the formed touch event. Then, the MCU 110 reads a next initial touch input from the register 140, and simultaneously the timer 150 re-starts to time.

In one embodiment, the MCU 110 stops supplying power to the CPU 120 so that the CPU 120 enters the sleep mode, and starts to supply power to the CPU 120 to waken the CPU 120.

In one embodiment, the CPU 120 includes a first pin 121 and a second pin 122. The MCU 110 sets power of the first pin 121 and the second pin 122 to a low voltage level in order to stop supplying power to the CPU 120, and sets the power of the first pin 121 and the second pin 122 to a high voltage level to start to supply power to the CPU 120.

It should be noted that the high voltage level and the low voltage level can correspond to logical 1/0, and can be defined according to different standards. In one example, a voltage higher than 1.8V may be defined as the high voltage level, and a voltage lower than 1.8V may be defined as the low voltage level. In another example, a voltage higher than 3.3V may be defined as the high voltage level, and a voltage lower than 3.3V may be defined as the low voltage level.

After being wakened up, the CPU 120 asks the MCU 110 why the MCU 110 wakens the CPU 120. After receiving asking from the CPU 120, the MCU 110 transmits the touch event to the CPU 120. Then, the CPU 120 receives the touch event, and executes the touch event to quickly turn a page of an e-book of the electronic device 100a. For example, if the touch event is a left sliding action, the CPU 120 executes the left sliding action to turn a previous page of the e-book of the electronic device 100a. If the touch event is a right sliding action, the CPU 120 executes the right sliding action to turn a next page of the e-book of the electronic device 100a.

Figure 4:
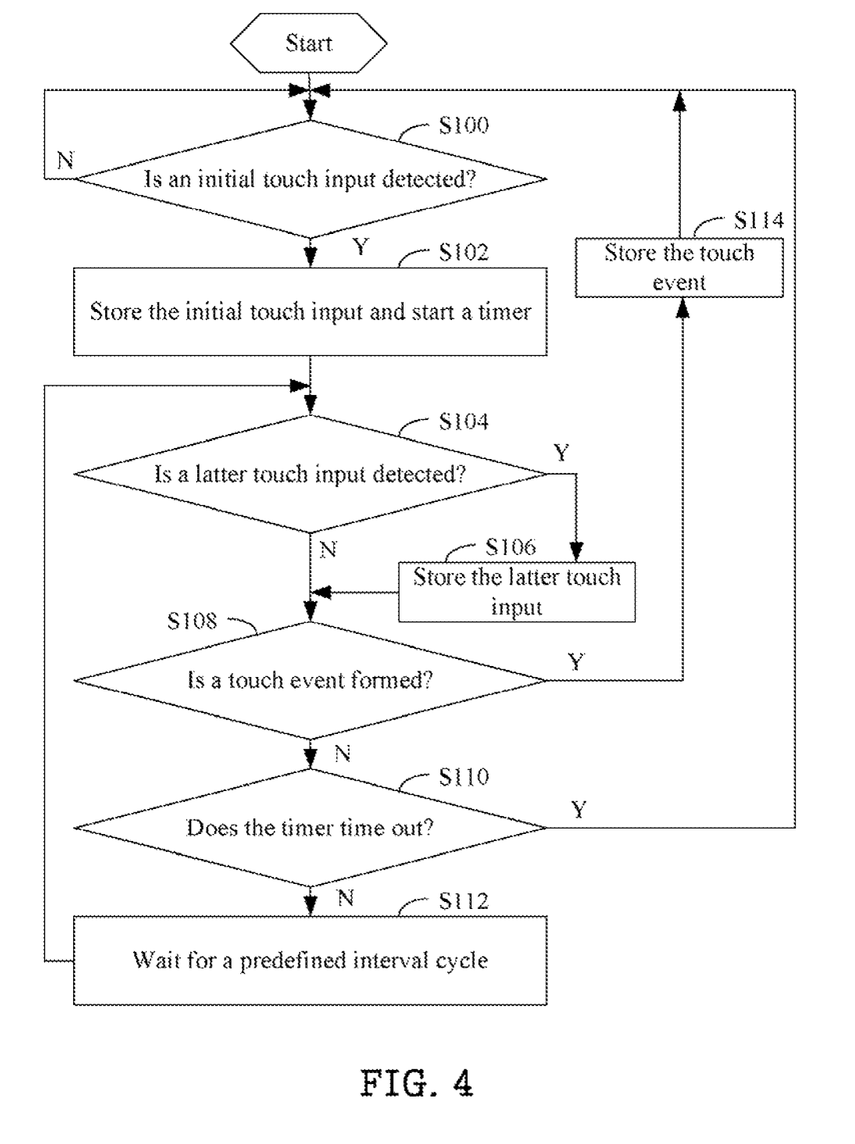
FIG. 4 is a flowchart of one embodiment of the electronic device detecting touch inputs in accordance with the present disclosure.

FIG. 4 is a flowchart of one embodiment of the electronic device 100a detecting touch inputs in accordance with the present disclosure. In one embodiment, the electronic device 100a detects the touch inputs via the functional modules such as those of FIG. 2. Depending on the embodiment, additional blocks may be added, others deleted, and the ordering of the blocks may be changed while remaining well within the scope of the disclosure.

In block S100, the MCU 110 waits for an initial touch input on the touch screen 130, and determines whether the initial touch input is detected on the touch screen 130. In one embodiment, the initial touch input can only be a left pressing action or a right pressing action because each touch event can only be initiated by the left pressing action or the right pressing action.

If the initial touch input is detected on the touch screen 130, in block S102, the MCU 110 stores the initial touch input in the register 140, and starts the timer 150.

In block S104, the MCU 110 determines whether a latter touch input is detected on the touch screen 130.

If a latter touch input is detected on the touch screen 130, in block S106, the MCU 110 stores the latter touch input in the register 140.

In block S108, the MCU 110 determines whether the initial and latter touch inputs stored in the register 140 form a touch event.

If the initial and latter touch inputs stored in the register 140 form a touch event, in block S114, the MCU 110 stores the touch event. Then going back to block S100, the MCU 110 waits for a next initial touch input.

If the initial and latter touch inputs stored in the register 140 do not form a touch event, in block S110, the MCU 110 determines whether the timer 150 times out.

If the timer 150 times out, going back to block S110, the MCU 110 waits for a next initial touch input.

If the timer 150 does not time out, in block S112, the MCU 110 waits for a predefined interval cycle. Then going back to block S104, the MCU 110 determines whether a next latter touch input is detected. In one embodiment, the predefined interval cycle is a time difference for detecting two neighbor touch inputs, which can be set to 30 ms.

The MCU 110 repeats the above blocks until the electronic device 100a is turned off.

Figure 5:
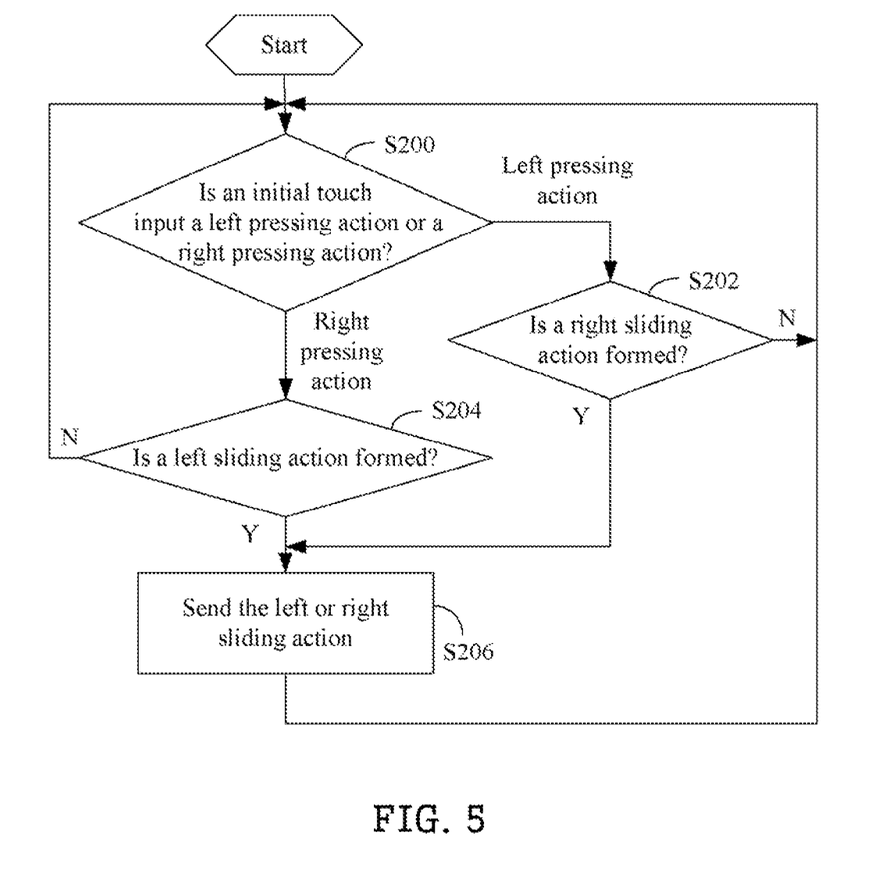
FIG. 5 is a flowchart of one embodiment of the electronic device determining whether touch inputs form a touch event in accordance with the present disclosure.

FIG. 5 is a flowchart of one embodiment of the electronic device 100a determining whether touch inputs form a touch event in accordance with the present disclosure. That is, FIG. 5 is the detailed flowchart of block S108 of FIG. 4.

In block S200, the MCU 110 determines whether the initial touch input read from the register 140 is a left pressing action or a right pressing action.

If the initial touch input is a left pressing action, in block S202, the MCU 110 determines whether the initial and latter touch inputs read from the register 140 form a right sliding action.

If the initial touch input is a right pressing action, in block S204, the MCU 110 determines whether the initial and latter touch inputs read from the register 140 form a left sliding action.

If the determining result of block S202 is that the right sliding action is not formed, or the determining result of block S204 is that the left sliding action is not formed, going back block S200, the MCU 110 continues to determine whether a next initial touch input read from the register 140 is a left pressing action or a right pressing action.

If the determining result of block S202 is that the right sliding action is formed, or the determining result of block S204 is that the left sliding action is formed, in block S206, the MCU 110 sends the right or left sliding action to the CPU 120.

The MCU 110 repeats the above blocks until the electronic device 100a is turned off.

In conclusion, the MCU 110 detects the touch inputs on the touch screen 130, and wakens the CPU 120 from the sleep mode when the touch inputs form the touch event. After being wakened up, the CPU 120 directly executes the touch event to quickly turn a page of the e-book of the electronic device 100 (100a), which has a good user experience.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. An electronic device with an e-book function, comprising:
    a touch screen;
    a central processing unit (CPU) operable to enter a sleep mode after turning a page of an e-book of the electronic device; and
    a microcontroller (MCU) operable to detect a plurality of touch inputs on the touch screen when the CPU is in the sleep mode, determine whether the plurality of touch inputs form a touch event, and awaken the CPU from the sleep mode upon the condition that the plurality of touch inputs form the touch event;
    wherein the CPU obtains the touch event from the MCU and executes the touch event to turn a page of the e-book of the electronic device; and
    wherein the plurality of touch inputs comprise pressing actions on different areas of the touch screen, and the touch event comprises a sliding action formed by the plurality of touch inputs on the touch screen.

2. The electronic device of claim 1, wherein the pressing actions on the different areas of the touch screen comprise a left pressing action and a right pressing action, and the sliding action formed by the plurality of touch inputs on the touch screen comprises a right sliding action and a left sliding action.

3. The electronic device of claim 2, wherein the MCU determines that the right sliding action on the touch screen is formed when the MCU detects the left pressing action and the right pressing action on the touch screen in sequence, and determines that the left sliding action on the touch screen is formed when the MCU detects the right pressing action and the left pressing action on the touch screen in sequence.

4. The electronic device of claim 3, wherein the plurality of touch inputs further comprise a left releasing action and a right releasing action on the touch screen.

5. The electronic device of claim 4, wherein:
    the MCU determines that the right sliding action on the touch screen is formed when the MCU detects the left pressing action, the left releasing action, and the right pressing action on the touch screen in sequence;
    the MCU determines that the right sliding action on the touch screen is formed when the MCU detects the left pressing action, the left releasing action, the right pressing action, and the right releasing action on the touch screen in sequence;
    the MCU determines that the left sliding action on the touch screen is formed when the MCU detects the right pressing action, the right releasing action, and the left pressing action on the touch screen in sequence; and
    the MCU determines that the left sliding action on the touch screen is formed when the MCU detects the right pressing action, the right releasing action, the left pressing action, and the left releasing action on the touch screen in sequence.

6. The electronic device of claim 4, further comprising a register operable to record the plurality of touch inputs on the touch screen.

7. The electronic device of claim 6, wherein the register comprises a first bit, a second bit, a third bit, and a fourth bit, respectively operable to record the left pressing action, the left releasing action, the right pressing action, and the right releasing action on the touch screen.

8. The electronic device of claim 6, further comprising a timer used for timing according to a predefined time period, wherein a duration of each touch event is not greater than the predefined time period.

9. The electronic device of claim 8, wherein the MCU detects the plurality of touch inputs on the touch screen according to a predefined interval cycle, records the plurality of touch inputs in the register, reads the plurality of touch inputs from the register, and determines whether the plurality of touch inputs within the predefined timing period form one touch event.

10. The electronic device of claim 1, wherein the MCU stops supplying power to the CPU when the CPU enters the sleep mode, and starts to supply power to the CPU to waken the CPU.

11. The electronic device of claim 10, wherein the CPU comprises a first pin and a second pin; and the MCU sets power of the first pin and the second pin to a low voltage level in order to stop supplying power to the CPU, and sets the power of the first pin and the second pin to a high voltage level to start to supply power to the CPU.

12. The electronic device of claim 1, wherein the pressing actions on the different areas of the touch screen comprise an up pressing action and a down pressing action, and the sliding action formed by the plurality of touch inputs on the touch screen comprises a down sliding action and an up sliding action.

13. The electronic device of claim 12, wherein the MCU determines that the down sliding action on the touch screen is formed when the MCU detects the up pressing action and the down pressing action on the touch screen in sequence, and determines that the up sliding action on the touch screen is formed when the MCU detects the down pressing action and the up pressing action on the touch screen in sequence.

14. The electronic device of claim 13, wherein the plurality of touch inputs further comprise an up releasing action and a down releasing action on the touch screen.

15. The electronic device of claim 14, wherein:
the MCU determines that the down sliding action on the touch screen is formed when the MCU detects the up pressing action, the up releasing action, and the down pressing action on the touch screen in sequence;
the MCU determines that the down sliding action on the touch screen is formed when the MCU detects the up pressing action, the up releasing action, the down pressing action, and the down releasing action on the touch screen in sequence;
the MCU determines that the up sliding action on the touch screen is formed when the MCU detects the down pressing action, the down releasing action, and the up pressing action on the touch screen in sequence; and
the MCU determines that the up sliding action on the touch screen is formed when the MCU detects the down pressing action, the down releasing action, the up pressing action, and the up releasing action on the touch screen in sequence.

16. An electronic device, comprising:
a touch screen;
a central processing unit (CPU); and
a microcontroller (MCU) operable to detect a plurality of touch inputs on the touch screen when the CPU is in a sleep mode, determine whether the plurality of touch inputs form a touch event, and awaken the CPU from the sleep mode upon the condition that the plurality of touch inputs form the touch event;
wherein the CPU obtains the touch event from the MCU and executes the touch event to turn a page of an e-book of the electronic device;
wherein the plurality of touch inputs comprise pressing actions on different areas of the touch screen, and the touch event comprises a sliding action formed by the plurality of touch inputs on the touch screen;
wherein the pressing actions on the different areas of the touch screen comprise a left pressing action and a right pressing action, and the sliding action formed by the plurality of touch inputs on the touch screen comprises a right sliding action and a left sliding action;
wherein the MCU determines that the right sliding action on the touch screen is formed when the MCU detects the left pressing action and the right pressing action on the touch screen in sequence, and determines that the left sliding action on the touch screen is formed when the MCU detects the right pressing action and the left pressing action on the touch screen in sequence;
wherein the plurality of touch inputs further comprise a left releasing action and a right releasing action on the touch screen; and
wherein:
the MCU determines that the right sliding action on the touch screen is formed when the MCU detects the left pressing action, the left releasing action, and the right pressing action on the touch screen in sequence;
the MCU determines that the right sliding action on the touch screen is formed when the MCU detects the left pressing action, the left releasing action, the right pressing action, and the right releasing action on the touch screen in sequence;
the MCU determines that the left sliding action on the touch screen is formed when the MCU detects the right pressing action, the right releasing action, and the left pressing action on the touch screen in sequence; and
the MCU determines that the left sliding action on the touch screen is formed when the MCU detects the right pressing action, the right releasing action, the left pressing action, and the left releasing action on the touch screen in sequence.

17. An electronic device, comprising:
a touch screen;
a central processing unit (CPU); and
a microcontroller (MCU) operable to detect a plurality of touch inputs on the touch screen when the CPU is in a sleep mode, determine whether the plurality of touch inputs form a touch event, and awaken the CPU from the sleep mode upon the condition that the plurality of touch inputs form the touch event;
wherein the CPU obtains the touch event from the MCU and executes the touch event to turn a page of an e-book of the electronic device;
wherein the plurality of touch inputs comprise pressing actions on different areas of the touch screen, and the touch event comprises a sliding action formed by the plurality of touch inputs on the touch screen;
wherein the pressing actions on the different areas of the touch screen comprise an up pressing action and a down pressing action, and the sliding action formed by the plurality of touch inputs on the touch screen comprises a down sliding action and an up sliding action;
wherein the MCU determines that the down sliding action on the touch screen is formed when the MCU detects the up pressing action and the down pressing action on the touch screen in sequence, and determines that the up sliding action on the touch screen is formed when the MCU detects the down pressing action and the up pressing action on the touch screen in sequence;
wherein the plurality of touch inputs further comprise an up releasing action and a down releasing action on the touch screen; and
wherein:
the MCU determines that the down sliding action on the touch screen is formed when the MCU detects the up pressing action, the up releasing action, and the down pressing action on the touch screen in sequence;

the MCU determines that the down sliding action on the touch screen is formed when the MCU detects the up pressing action, the up releasing action, the down pressing action, and the down releasing action on the touch screen in sequence;

the MCU determines that the up sliding action on the touch screen is formed when the MCU detects the down pressing action, the down releasing action, and the up pressing action on the touch screen in sequence; and the MCU determines that the up sliding action on the touch screen is formed when the MCU detects the down pressing action, the down releasing action, the up pressing action, and the up releasing action on the touch screen in sequence.

* * * * *